US009176958B2

(12) United States Patent
Yang et al.

(10) Patent No.: US 9,176,958 B2
(45) Date of Patent: Nov. 3, 2015

(54) METHOD AND APPARATUS FOR MUSIC SEARCHING

(71) Applicant: International Business Machines Corporation, Armonk, NY (US)

(72) Inventors: Xin Ying Yang, Beijing (CN); Xiang Zhou, Beijing (CN); Shan Shan Wang, Beijing (CN); Heng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/795,602

(22) Filed: Mar. 12, 2013

(65) Prior Publication Data

US 2013/0339349 A1 Dec. 19, 2013

(30) Foreign Application Priority Data

Jun. 19, 2012 (CN) .......................... 2012 1 0208777

(51) Int. Cl.
*G06F 17/00* (2006.01)
*G06F 17/30* (2006.01)

(52) U.S. Cl.
CPC .... *G06F 17/30026* (2013.01); *G06F 17/30743* (2013.01); *G10H 2210/076* (2013.01)

(58) Field of Classification Search
CPC .......... G06F 17/3053; G06F 17/30864; G06F 17/30038; G06F 17/30867; G06F 17/30595
USPC .......................................................... 707/749
See application file for complete search history.

(56) References Cited

U.S. PATENT DOCUMENTS

| 7,231,389 | B2 | 6/2007 | Yamane et al. |
| 7,680,788 | B2 | 3/2010 | Woo |
| 7,838,755 | B2 | 11/2010 | Taub et al. |
| 2003/0205124 | A1 | 11/2003 | Foote et al. |
| 2007/0006717 | A1 | 1/2007 | Myeong et al. |
| 2007/0169613 | A1 | 7/2007 | Kim et al. |
| 2008/0215494 | A1* | 9/2008 | Corbett ............................ 705/80 |

OTHER PUBLICATIONS

Gouyon, et al. "Dance Music Classification: A Tempo-Based Approach" URL: http://dblab.cs.nccu.edu.tw/presentation/980105/p447-knees-SigiR%2007%20Proceedings%20off020the%-2030th%20=annual%20international% 20ACIW/020SigiR%-20conference%20on%20Research%20and%development%20in%-20information%20retrieval.pdf; Proceedings of the 30th annual international ACM SIGIR conference on Research and development in information retrieval, 2007, 8 pages.
Knees et al., "A Music Search Engine Built upon Audio-based and Web-based Similarity Measures", URL: http://www.ee.columbia.edu/~dpwe/ismir2004/CRFILES/paper151.pdf; Proceedings of the 5th International Conference on Music Information Retrieval, 2004, 4 pages.
Hanna P, Robine M (2009) Query by tapping system based on alignment algorithm. In: IEEE international conference on acoustics, speech and signal processing (ICASSP), pp. 1881-1884.
Nicola Orio, "Music Retrieval: A Tutorial and Review", Foundations and Trends in Information Retrieval, vol. 1, No. 1 (Nov. 2006) 1-90.

\* cited by examiner

*Primary Examiner* — Truong Vo
(74) *Attorney, Agent, or Firm* — Cantor Colburn LLP; Yeen Tham

(57) ABSTRACT

In an exemplary embodiment of this disclosure, a method may include generating a tempo scale set based on a received query, where the query includes a plurality of query values defining a tempo of music to be searched. A tempo word set may be constructed based on the generated tempo scale set. The tempo word set may include one or more tempo words, where each tempo word includes at least one tempo scale in the tempo scale set. The music may be identified using the constructed tempo word set.

17 Claims, 6 Drawing Sheets

METHOD AND APPARATUS FOR MUSIC SEARCHING

CROSS-REFERENCE TO RELATED APPLICATION

This application claims priority to Chinese Patent Application No. 201210208777.8, filed 19 Jun. 2012, and all the benefits accruing therefrom under 35 U.S.C. §119, the contents of which in its entirety are herein incorporated by reference.

BACKGROUND

The disclosed technology relates to audio processing and, more particularly, to a tempo-based music search technology.

With the development of entertainment information technology, consumers tend to require high-quality and high-speed information access. In the field of music searching, due to limitations of traditional text-based search manners, a plurality of melody-based music search engines have been developed in recent years, such as Shazam from Apple Inc., SoundHound from Google Inc. and Midomi from Melodis Inc.

In melody-based music search engines, a user may search musical information that most fits the melody by humming a musical segment in an audio input device. During the searching, a user may find a matched song in a database by only humming a song rather than inputting any textual information related to the song, such as a composer, a singer, or a song's name. Compared to traditional text-based search manners, melody-based music search technology provides a better user experience. For example, if you hear a song but do not know its name, it is possible to identify the song by means of the melody-based music search technology so long as the melody is memorized.

SUMMARY

In one embodiment, a method may include generating a tempo scale set based on a received query, where the query includes a plurality of query values defining a tempo of music to be searched. A tempo word set may be constructed based on the generated tempo scale set. The tempo word set may include one or more tempo words, where each tempo word includes at least one tempo scale in the tempo scale set. The music may be identified using the constructed tempo word set.

In another embodiment, an apparatus for searching music may include a tempo scale set generating unit, a tempo word set constructing unit, and a music identification unit. The tempo scale set generating unit may be configured to generate a tempo scale set based on a received query, where the query includes a plurality of query values that define a tempo of music to be searched. The tempo word set constructing unit may be configured to construct a tempo word set based on the tempo scale set generated by said tempo scale set generating unit. The tempo word set may include a plurality of tempo words, where each tempo word in said tempo word set includes at least one tempo scale in said tempo scale set. The music identification unit may be configured to identify the searched music using the tempo word set constructed by said tempo word set constructing unit.

In yet another embodiment, a computer program product may include a computer readable storage medium having computer readable program code embodied thereon. The computer readable program code may be executable by a processor to perform a method. That method may include generating a tempo scale set based on a received query, where the query includes a plurality of query values defining a tempo of music to be searched. According to the method, a tempo word set may be constructed based on the generated tempo scale set. The tempo word set may include one or more tempo words, where each tempo word includes at least one tempo scale in the tempo scale set. The music may be identified using the constructed tempo word set.

Additional features and advantages are realized through the techniques of the disclosed technology. Other embodiments and aspects of the disclosed technology are described in detail herein. For a better understanding of the invention with the advantages and the features, refer to the description and drawings.

BRIEF DESCRIPTION OF THE SEVERAL VIEWS OF THE DRAWINGS

Embodiments of the disclosed technology will now be described, by means of example only, with reference to the accompanying drawings in which.

DETAILED DESCRIPTION

Some embodiments will be described in more detail with reference to the accompanying drawings. However, the present disclosure can be implemented in various manners, and thus should not be construed to be limited to the embodiments disclosed herein.

To a large extent, the accuracy of melody-based music search technology depends on intonation of a user's humming, and thus it less effective for a user who is insensitive to melody, a user who has reduced intonation, or a user with paragammacism. Melody-based music search technology is often not effective in implementing humming searches in noisy environments. For example, in an environment with loud background noises, such as subways, buses, and cafes, the result of a humming search is not highly accurate. Additionally, a user who is concerned about disturbing others when searching in public may find it inconvenient to hum loudly, which also reduces the effectiveness of a melody-based search.

The disclosed technology provides a method and apparatus for searching on the basis of a tempo of music. Embodiments of the disclosed technology may obtain a tempo scale set for music to be searched by identifying and processing a tempo query input by a user (e.g. a series of taps on a touch input device). An embodiment may then construct a tempo word set on the basis of the tempo scale set, and may utilize the constructed tempo word set to identify music or one or more musical segments.

With the disclosed technology, music or musical segments may be searched only, or at least partially, on the basis of a musical tempo, without the need for a musical melody.

With the disclosed technology, a rapid and accurate music search may be performed.

With the disclosed technology, a proper fault-tolerant search may be performed in combination with such factors as the received music tempo, a user's preferences, and a historical record.

Figure 1:
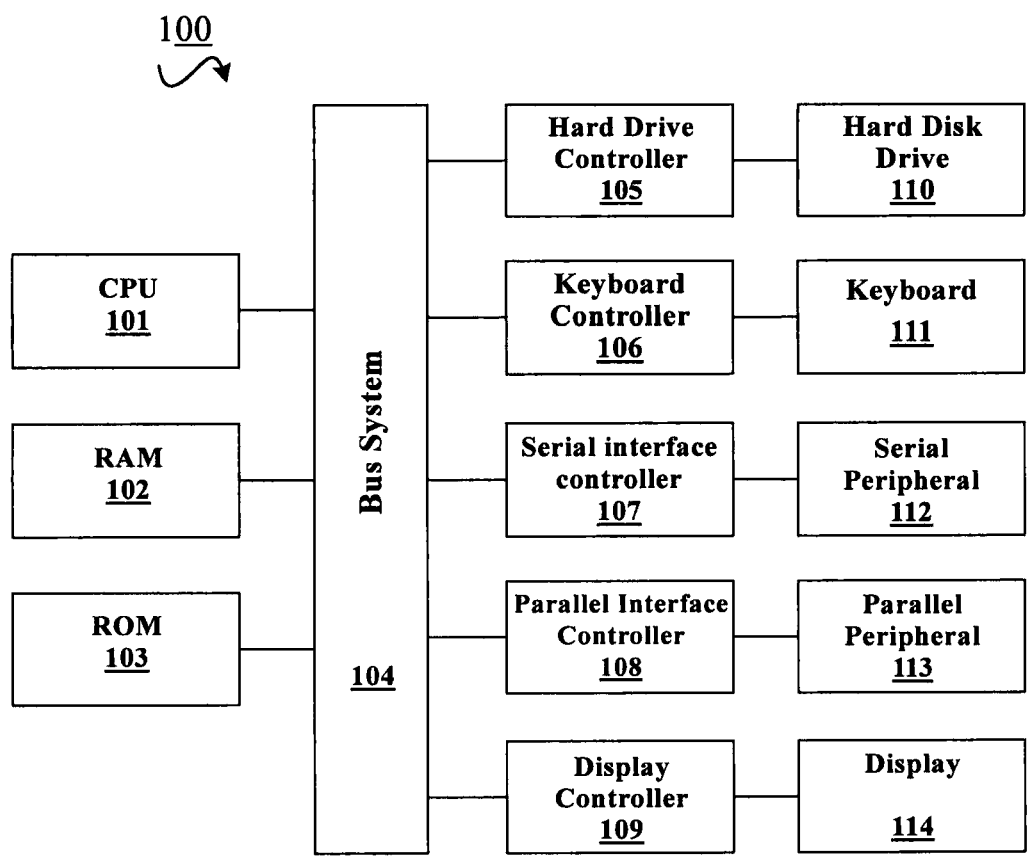
FIG. 1 shows an exemplary computer system 100, according to an embodiment of the disclosed technology.

FIG. 1 shows an exemplary computer system 100 applicable to implement some embodiments of the disclosed technology. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113, and Display 114. Among the above devices, CPU 101, RAM 102, ROM 103, Hard Drive Controller 105, Keyboard Controller 106, Serial Interface Controller 107, Parallel Interface Controller 108, and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for the exemplary purpose rather than any limitation to the disclosed technology. It will be understood that the computer system 100 in FIG. 1 is provided for illustrative purposes only and does not limit the various types of computer systems that may be used for the disclosed technology. In some cases, devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processing of a general purpose computer, special purpose computer, or other programmable data processing apparatus to produce a machine, such that the instructions, which execute via the processing of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As mentioned above, in order to rapidly and accurately search music or identify musical segments without the need of musical melody, the method and apparatus for tempo-based searching in the disclosed technology may obtain a tempo scale set for music to be searched from a musical tempo query input by a user, construct a tempo word set on the basis of the tempo scale set, and finally utilize the constructed tempo word set to identify music or one or more musical segments.

Figure 2:
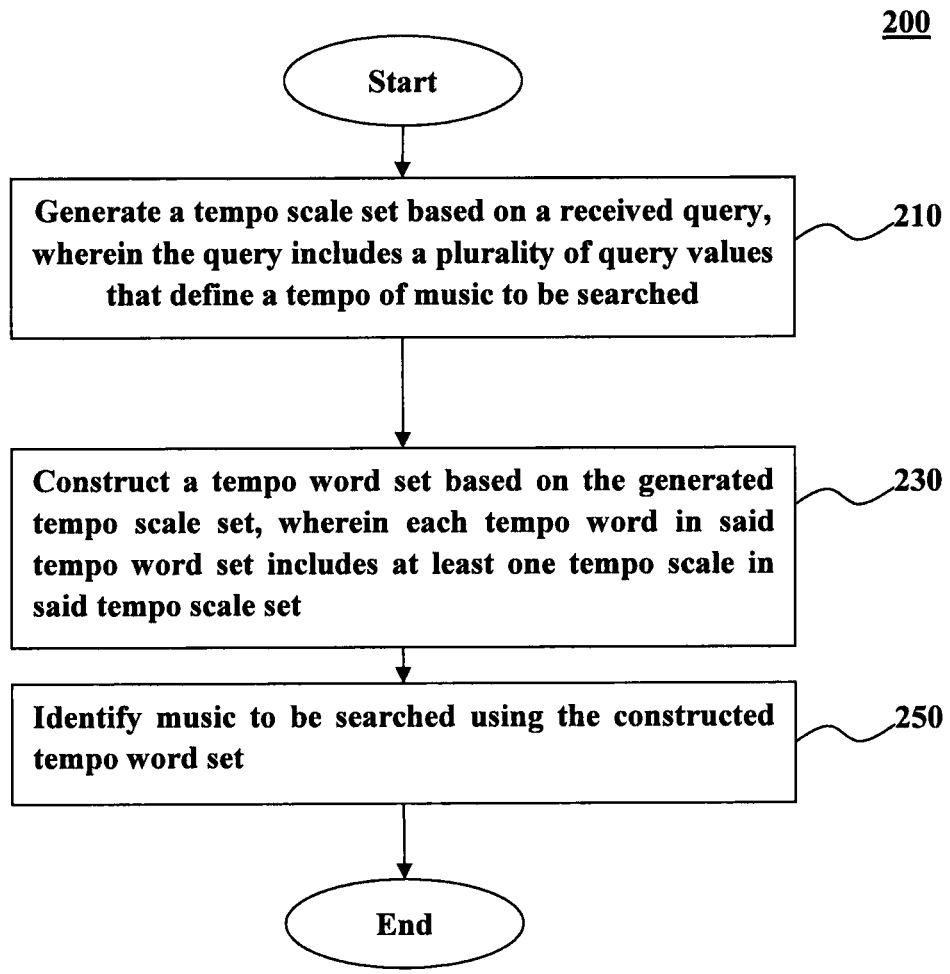
FIG. 2 is a flow chart illustrating a tempo-based music search method 200, according to an embodiment of the disclosed technology.

Embodiments of the disclosed technology will be specifically described with reference to FIGS. 2-6. FIG. 2 is a flow chart illustrating a tempo-based music search method 200 according to some embodiments of the disclosed technology. First, at block 210, a user may input a tempo-based query. As used therein, "query" is defined as a pulse train that is capable of describing tempo of music to be searched or segment(s) thereof, for example, a time pulse train. A query may include a plurality of query values corresponding to a pulse to be searched. For example, in a case that a query is a time pulse train, the query values correspond to timings of query pulses.

Figure 3A:
FIGS. 3A and 3B illustrate an example of a musical segment and an input query for the segment, according to an embodiment of the disclosed technology.
Figure 3B:
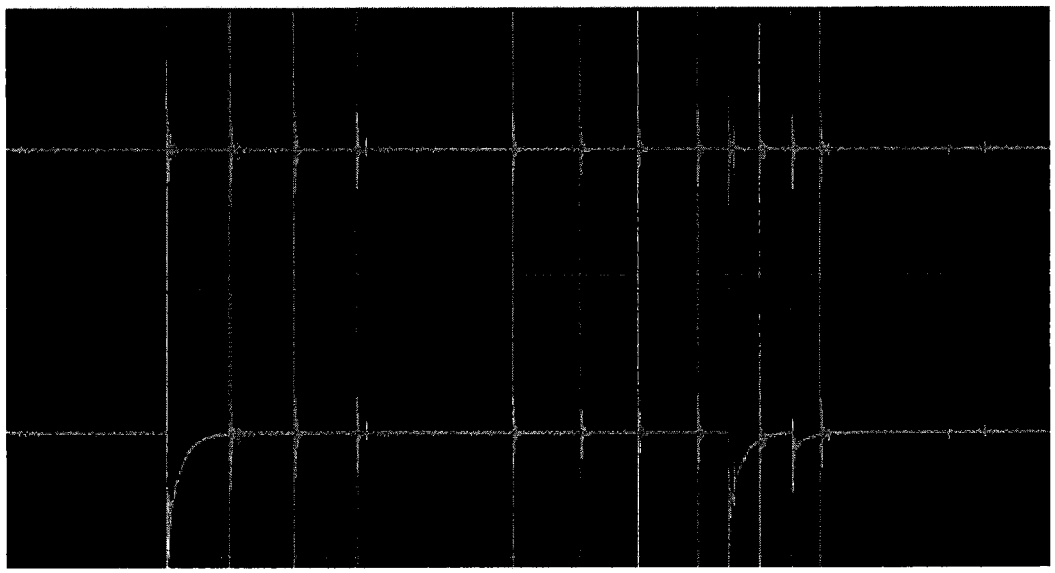

FIG. 3A illustrates a staff of one musical segment, while FIG. 3B illustrates a time pulse train that may be received and used to search the musical segment illustrated in FIG. 3A, where the horizontal axis represents time, and the longitudinal axis represents pulse intensity. In some embodiments, a user may input pulses for a query by using an input device, such as a touch input device, a keyboard, a keypad, a microphone, or the like. For example, a user may input a query by tapping on a predetermined area of a touch screen display corresponding to a tempo of the music to be searched. The manners of receiving a user's query need not be limited to tapping. In another embodiment, a user may input a query by shaking an angular motion sensor, such as a gyroscope or an accelerometer, according to the tempo corresponding to the music to be searched.

In embodiments, each pulse received marks the beginning of one note. In embodiments, each pulse received may also mark the end of the previous note if there was a previous note. A module of system 100 (FIG. 1) captures time intervals between successive pulses that it receives as a search query from an input device. In the example illustrated in FIG. 3B, the capture times are sequentially as follows: (0.2, 0.19, 0.2, 0.21, 0.6, 0.19, 0.2, 0.2, 0.1, 0.09, 0.1, 0.09). These interval times between received pulses may be referred to herein as "query values." It should be noted that according to advantageous arrangements disclosed herein below, the specific query values in a query need not matter, since disclosed embodiments of tempo-based searching may focus on ratios of respective values in a query value sequence.

After an input query has been received, a tempo scale set is generated on the basis of the received query (block 210 of FIG. 2). The term "tempo scale" as used herein may refer to a value or symbol extracted from a query to represent musical tempo of a note. It should be appreciated that in common musical parlance, the term "musical scale" may refer to a set of musical notes ordered by pitch and, similarly, the term "tempo scale" may refer to a set of tempi ordered by beats per minute. In contrast, the term "tempo scale" as used herein refers to a duration of single note (or the duration of time between beginnings of respective notes) that has been normalized, i.e., scaled, in a particular fashion as disclosed herein.

Generally speaking, the tempo scales may be chosen to have values that facilitate subsequent music search processing. Therefore, the tempo scales are extracted from a query to facilitate music storing and searching.

A query entered by a user may provide a plurality of query values, together forming the input tempo. In one embodiment, each query value in the received query may be mapped to a tempo scale corresponding to a note. A note may describe a length of a sound. A "note" as used herein may refer to, for example, the most common seven notes in the field of music, i.e. a whole note, a half note, a quarter note, a eighth note, a sixteenth note, thirty-second note, and a sixty-four note. Each note may be assigned a particular value. For example, the aforementioned seven notes may respectively be represented by positive integers from 1 to 7, which may be used as the tempo scales. In this case, a tempo scale set may be a set composed of positive integers from 1 to 7, where each integer corresponds to one of the aforementioned seven notes. A person skilled in the art will understand that it is absolutely possible to use other values or symbols, other than positive integers, to represent tempo scales corresponding to the seven notes or according to another set of notes.

In some other embodiments, a tempo scale may be determined by a ratio of adjacent query values. For example, for each query value in the received query other than a first query value, the tempo scale may be calculated as a ratio of the query value to a previous value in the query. The previous query value used for each query value in question may occur in the query, separated from the current query value by a predetermined step, being a predetermined number of other query values. For instance, each query value may be compared to the immediately prior query value. In some embodiments, before a tempo scale is calculated, each query value may be rounded off, for example by utilizing a rounding-up method. That is, each note, as indicated by its corresponding query value, may be represented as a tempo scale that is determined by the ratio of the note's query value to the previous note's query value. Taking the query of FIG. 3B (0.2, 0.19, 0.2, 0.21, 0.6, 0.19, 0.2, 0.21, 0.1, 0.09, 0.1, 0.09) as an example, the ratios are 0.19/0.2, 0.2/0.19, 0.21/0.2, 0.6/0.21, 0.19/0.6, 0.2/0.19, 0.21/0.19, 01./0.21, etc., so that its tempo scale set, which excludes a tempo scale for the first query value, may be calculated (by rounding off) to be (1, 1, 1, 3, ⅓, 1, 1, ½, 1, 1, 1) according to one embodiment of the calculation method for the ratio.

Next, at block 230 of FIG. 2, a tempo word set may be constructed on the basis of the generated tempo scale set. As used herein, the term tempo word may refer to an array composed of a predetermined number of tempo scales. Music search through the use of tempo words may greatly improve searching efficiency and thus provide a better user experience than melody-searching.

Figure 4:
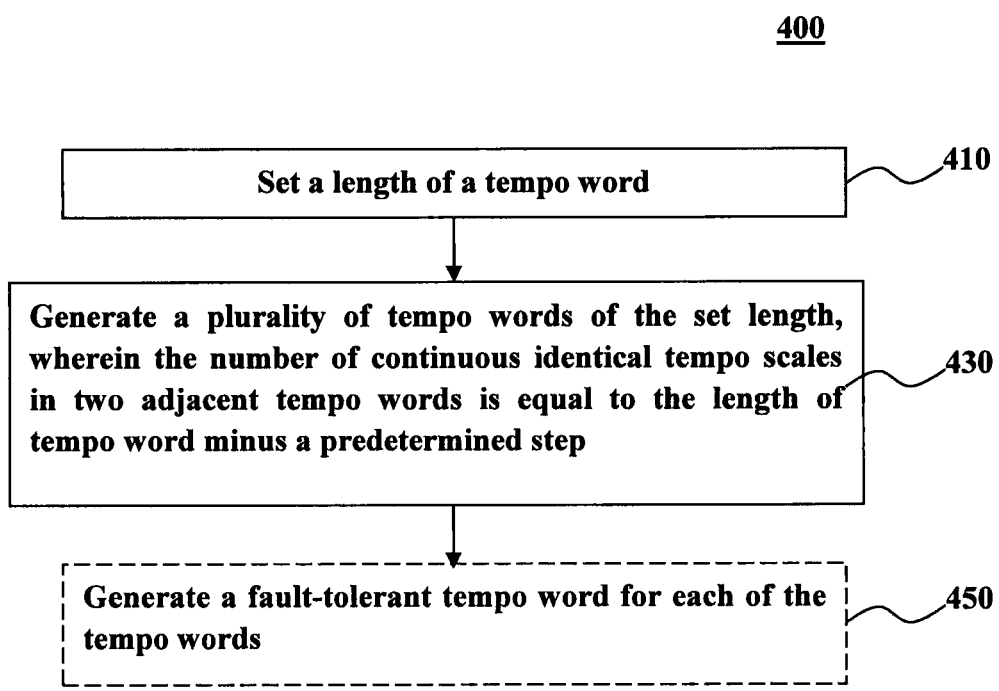
FIG. 4 is a flow chart illustrating a method 400 for constructing a tempo word set, according to an embodiment of the disclosed technology.

FIG. 4 illustrates in more detail a specific implementation for block 230, constructing a tempo word set, according to some embodiments of the disclosed technology. In method 400, a tempo word set may be generated by collecting, in order, a plurality of the tempo scales, where the collected tempo scales are positioned in the tempo scale set at intervals of a predetermined step size. At block 410, a length L of a tempo word may be set such that the length L indicates a number of tempo scales contained in the tempo word. Note that the length of a tempo word may be different for different music or musical segments. Further, specific features of music or a musical segment may be considered in setting the length of the tempo word. For example, rest notes contained in music or music segments may be considered, or they may be excluded.

Next, the method 400 may proceed to block 430, in which a plurality of tempo words having the length L are generated from the tempo scales in the tempo scale set, such that the number of continuous identical tempo scales in two adjacent tempo words is equal to the length of the tempo word minus the predetermined step.

As an example, a tempo scale set (1, 1, 1, 3, ⅓, 1, ½, 1, 1, 1) may be acquired from the query of FIG. 3B, and the length L of a tempo word may be set to 5 while the predetermined step between tempo words is 1. This can achieve seven tempo words provided by Table 1 as follows:

TABLE 1

Instances of tempo words with a length of 5 and a step of 1

| | Tempo scale set | | | | | | | | | |
|---|---|---|---|---|---|---|---|---|---|---|
| | 1 | 1 | 1 | 3 | ⅓ | 1 | 1 | ½ | 1 | 1 | 1 |
| Tempo word W1 | 1 | 1 | 1 | 3 | ⅓ | | | | | | |
| Tempo word W2 | | 1 | 1 | 3 | ⅓ | 1 | | | | | |
| Tempo word W3 | | | 1 | 3 | ⅓ | 1 | 1 | | | | |
| Tempo word W4 | | | | 3 | ⅓ | 1 | 1 | ½ | | | |
| Tempo word W5 | | | | | ⅓ | 1 | 1 | ½ | 1 | | |
| Tempo word W6 | | | | | | 1 | 1 | ½ | 1 | 1 | |
| Tempo word W7 | | | | | | | 1 | ½ | 1 | 1 | 1 |

It will be understood that, in order to illustrate continuous identical tempo scales between adjacent tempo words, the above table shows all the seven tempo words W1 to W7 in a successive and staggered manner. As a matter of fact, each of the seven tempo words W1 to W7 in Table 1 has a length L of 5, e.g., W1 is (1, 1, 1, 3, ⅓), W2 is (1, 1, 3, ⅓, 1), and so on.

A person skilled in the art will understand that, although the generation of tempo words has been described by taking a length L=5 and a predetermined step=1 as an example above, it is completely possible to choose a length and a predetermined step of other values. In some embodiments, the length and the predetermined step may be chosen with the memory capacity of a database and the search speed in mind. Apparently, the longer the length of tempo word is, the larger the memory capacity of a database required to store tempo words of a music sample will be, but the shorter the search duration will be.

Additionally, in order to improve the detection rate, in one embodiment of the disclosed technology, the constructing processing of a tempo word set may be further incorporated with a fault-tolerant mechanism. As shown in block 450 of FIG. 4, the method 400 further includes generation of a fault-tolerant tempo word for each of the tempo words generated in block 430. The fault-tolerant tempo words generated in block 450 and the tempo words generated in block 430 may together constitute a tempo word set.

Figure 5:
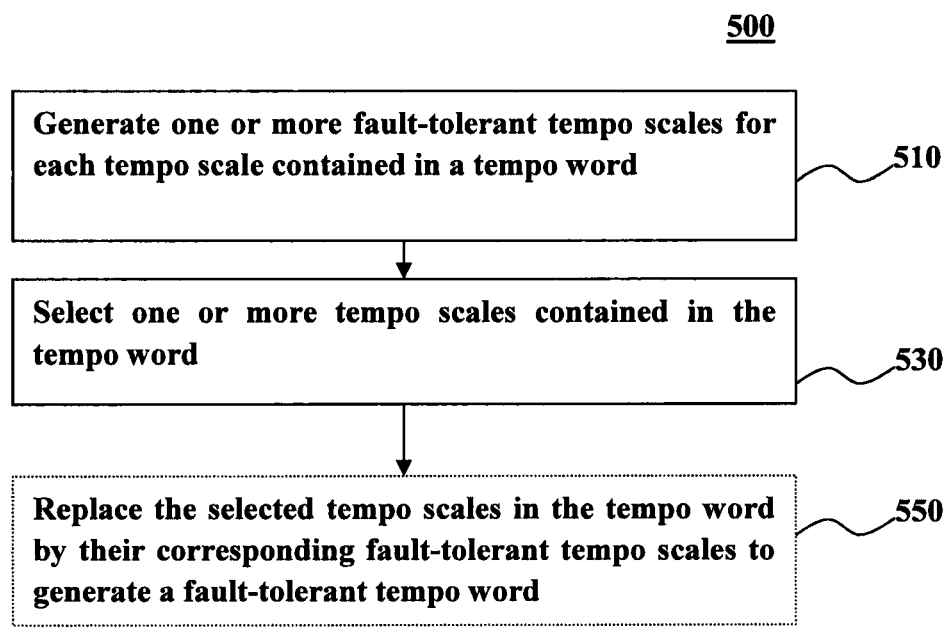
FIG. 5 is a flow chart illustrating a fault-tolerant tempo word generating method 500, according to an embodiment of the disclosed technology.

FIG. 5 illustrates in more detail a specific implementation method 500 of block 450. First, in block 510, one or more fault-tolerant tempo scales may be generated for each tempo scale contained in the tempo word generated in block 430. In one embodiment, all the tempo scales in the tempo scale set are ranked. Then, for each tempo scale contained in the tempo word, a predetermined number of tempo scales that are anteriorly or posteriorly ranked are determined as fault-tolerant tempo scales of the tempo scale.

For example, in the case of generating a tempo scale set by mapping a query value to a note in block 210, the tempo scales may be ranked according to a length of a note. Taking a tempo scale corresponding to an eighth note, for example, the tempo scales that are ranked before and after may be tempo scales corresponding to a quarter note and a sixteenth note, respectively. Then, a quarter note and a sixteenth note may be selected as fault-tolerant tempo scales corresponding to the tempo scale. A person skilled in the art can choose a proper number of fault-tolerant tempo scales as necessary on the basis of the requirements for detection rate and restrictions on the memory capacity required to store the fault-tolerant tempo words.

After the fault-tolerant tempo scales are determined, one or more tempo scales contained in one tempo word are selected in block 530, and the selected tempo scales may be replaced by corresponding fault-tolerant tempo scales in block 550 to generate fault-tolerant tempo words.

The tempo word W4 (3, ⅓, 1, 1, ½) in Table 1 is taken as an example to describe aforementioned blocks 510 to 550. First, a tempo scale set (1, 1, 1, 3, ⅓, 1, 1, ½, 1, 1, 1) corresponding to the tempo word may be ranked by magnitude to obtain a ranking result of 3→1→½→⅓. Suppose a previous and a next (if any) tempo scale of each tempo scale is selected as its fault-tolerant tempo scale. For example, the fault-tolerant tempo scales of ½ may include 1 and ⅓. The fault-tolerant tempo scales C1 to C8 as shown in Table 2 may be achieved by replacing, for each tempo scale contained in the tempo word W4, the tempo scale by respective fault-tolerant tempo scales.

TABLE 2

Instances of fault-tolerant tempo words

| W4 | 3 | ⅓ | 1 | 1 | ½ |
|---|---|---|---|---|---|
| C1 | 1 | ⅓ | 1 | 1 | ½ |
| C2 | 3 | ½ | 1 | 1 | ½ |
| C3 | 3 | ⅓ | 3 | 1 | ½ |
| C4 | 3 | ⅓ | ½ | 1 | ½ |
| C5 | 3 | ⅓ | 1 | 3 | ½ |
| C6 | 3 | ⅓ | 1 | ½ | ½ |
| C7 | 3 | ⅓ | 1 | 1 | 1 |
| C8 | 3 | ⅓ | 1 | 1 | ⅓ |

In other embodiments, the fault-tolerant tempo words can also be generated on the basis of a user's preferences, a historical fault-tolerant record, or a probability sample's forecast result. For example, if a user habitually mis-taps, over-taps, or less-taps one or more notes in tapping to input a query for a song, such characteristics of the user may be recorded as a preference for a fault-tolerant tempo word particular to the user. In addition, for example, when a method of the disclosed technology is applied online, it is possible to configure a learner to forecast a proper range of fault-tolerant tempo words by training query samples of a number of users. A person skilled in the art will further understand that, in addition to the aforementioned fault-tolerant mechanism, existing fault-tolerant search algorithms may be used in the disclosed technology.

Now returning to FIG. 2, after a tempo word set is determined in block 230, method 200 proceeds to block 250. At block 250, music to be searched, such as musical segment as shown in FIG. 3A, may be identified by using the constructed tempo word set. It may be possible to use existing search algorithms to effectuate the aforementioned identification in a database containing tempo words of music.

The music search method of the disclosed technology may be combined with existing music player application programs or multimedia management application programs. In one implementation, tempo words in a piece of music or in the music's its most representative segment may be contained in metadata of music to facilitate searching and identification. A user may utilize the aforementioned music search method 200 to search desired music in database and rapidly identify a particular segment of music. In another implementation, a user may customize a particular query directed to one or more particular musical works.

Figure 6:
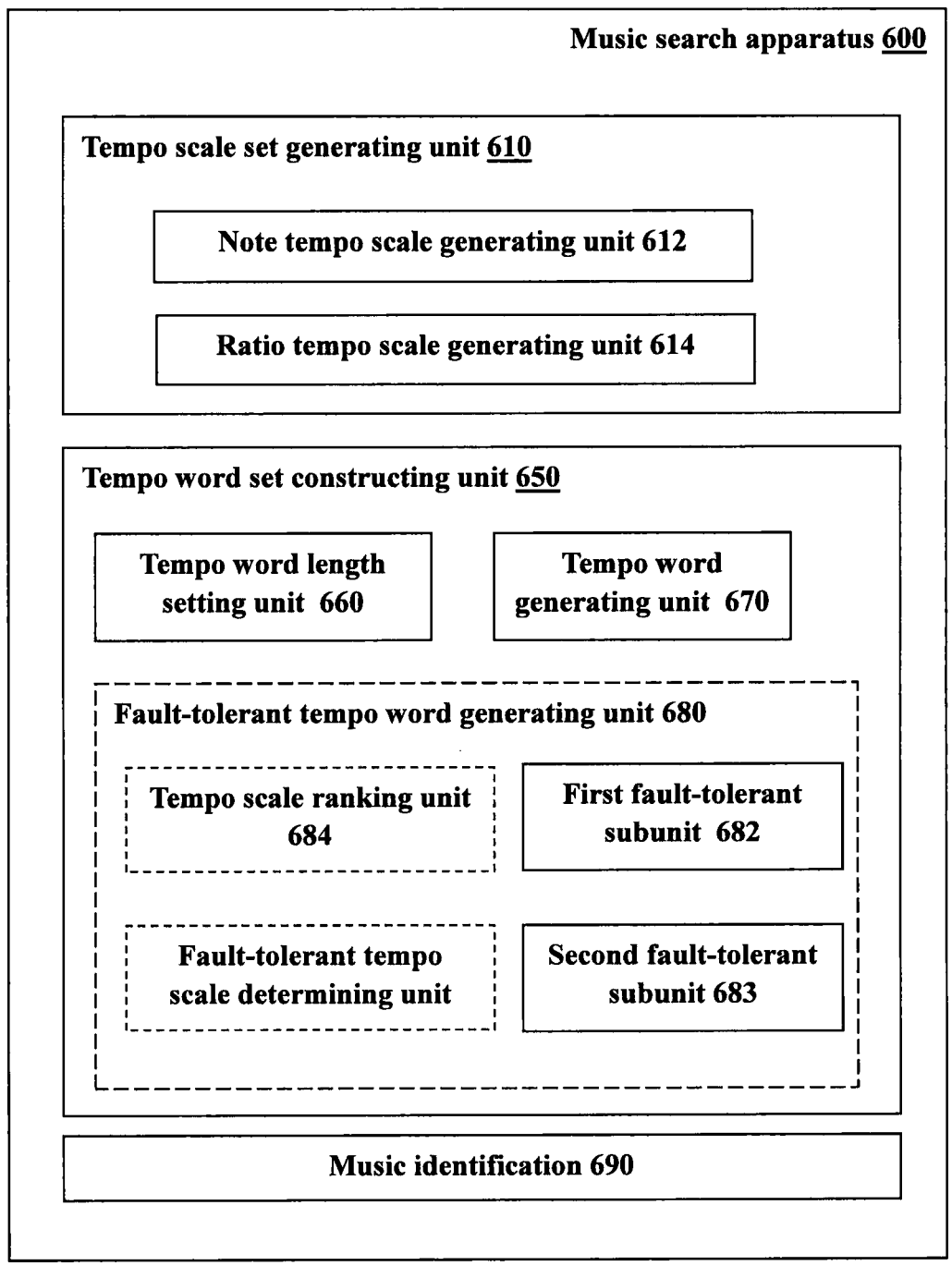
FIG. 6 shows a functional block diagram of a music search apparatus 600, according to an embodiment of the disclosed technology.

FIG. 6 shows a functional block diagram of a music search apparatus 600 according to some embodiments of the disclosed technology. The modules of the music search apparatus 600 may be implemented in hardware, software, or a combination of hardware and software realizing the principle of this disclosed technology. Those skilled in the art will understand that the modules shown in FIG. 6 may be combined or subdivided into sub-modules to realize the principle of this disclosed technology, and modules may be removed or added. Thus, the description herein may support various possible combinations of modules.

The music search apparatus 600 may include a tempo scale set generating unit 610, a tempo word set constructing unit 650, and a music identification unit. The tempo scale set generating unit 610 may be configured to generate a tempo scale set based on a received query, wherein the query includes a plurality of query values that define a tempo of the music to be searched. In one embodiment, the query corresponds to a series of taps by a user on such input devices as a touch input device, a keyboard, a keypad, or a microphone. In another embodiment, the query corresponds to a series of shakings performed by a user by utilizing an angular motion sensor such as a gyroscope or an accelerometer, according to a corresponding tempo.

In some embodiments, the tempo scale set generating unit 610 may include a note tempo scale generating unit 612. The note tempo scale generating unit 612 may be configured to map each query value of the received query to a tempo scale corresponding to a note. Alternatively, in another embodiment, the tempo scale set generating unit 610 may include a ratio tempo scale generating unit 614. The ratio tempo scale generating unit 614 may be configured to calculate, for each query value in the received query other than a first query value, a ratio of the query value to a previous query value, as a tempo scale of the query value.

The tempo word set constructing unit 650 may be configured to construct a tempo word set based on the tempo scale set generated by the tempo scale set generating unit 610, wherein each tempo word in the tempo word set includes at least one tempo scale in the tempo scale set. In one embodiment, the tempo word set constructing unit 650 may comprise a tempo word length setting unit 660 and a tempo word generating unit 670. The tempo word length setting unit 660 may be configured to set a length of a tempo word, the length indicating the number of tempo scales contained in the tempo word. The tempo word setting unit 670 may be configured to generate a plurality of tempo words of the length set by the tempo word length setting unit 660. Each tempo word may be generated to be one or more selected tempo scales in the tempo scale set, where the selected tempo scales are separated from one another by a predetermined step in the tempo scale set and positioned in the tempo word in the order they occurred in the tempo scale set. The number of continuous identical tempo scales in two adjacent tempo words may be equal to the length of tempo word minus the predetermined step.

The tempo word set constructing unit 650 may further include a fault-tolerant tempo word generating unit 680, which may be configured to generate a fault-tolerant tempo word for each of the tempo words. In one implementation, the fault-tolerant tempo words may be generated on the basis of a user's preferences, a historical fault-tolerant record a probability sample's forecast result, or a combination thereof.

The fault-tolerant tempo word generating unit 680 may further include a first fault-tolerant subunit 682, configured to select one or more tempo scales contained in a corresponding tempo word; and a second fault-tolerant subunit 683, configured to replace the selected tempo scales in the corresponding tempo word with corresponding fault-tolerant tempo scales to generate a fault-tolerant tempo word.

The fault-tolerant tempo word generating unit 680 may further include a tempo scale ranking unit 684, configured to rank the tempo scales in said tempo scale set; and a fault-tolerant tempo scale determining unit 685, configured to select for each tempo scale contained in a tempo word, a predetermined number of tempo scales that are anteriorly or posteriorly ranked, as fault-tolerant tempo scales corresponding to the tempo scale.

The music identification unit 690 may be configured to identify music to be searched using the tempo word set constructed by the tempo word set constructing unit 650.

The music search apparatus 600 as shown in FIG. 6 may be combined into an electronic device, such as a desktop computer, tablet computer, laptop computer, personal digital assistant, multimedia player, smartphone, or game machine, that has an input device capable of receiving a query to define a tempo of music or one or more segments thereof. The input device may include such devices as a touch input device, keyboard, keypad, microphone, gyroscope, accelerometer, or the like.

With the music searching method and apparatus of the disclosed technology, it may be possible to search music or to identify musical segments only, or at least partially, on the basis of musical tempo without the need for receiving a melody.

With the music searching method and apparatus of the disclosed technology, it may be further possible to perform a rapid and accurate music search.

With the music searching method and apparatus of the disclosed technology, it may be further possible to provide a proper fault-tolerant search in combination with such factors as received music tempo, a user's preference, and a historical record.

The flowchart and block diagrams in the figures illustrate the architecture, functionality, and operation of possible implementations of systems, methods, and computer program products according to various embodiments of the disclosed technology. In this regard, each block in the flowchart or block diagrams may represent a module, segment, or portion of code, which may comprise one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and flowchart illustration, and combinations of blocks in the block diagrams and flowchart illustration, may be implemented by special purpose hardware-based systems that perform the specified functions, or combinations of special purpose hardware and computer instructions.

The descriptions of various embodiments of the disclosed technology have been presented for purposes of illustration. These descriptions are not exhaustive and do not limit the various potential embodiments. Many modifications and variations will be apparent to those of ordinary skill in the art without departing from the scope and spirit of the described embodiments. The terminology used herein was chosen to best explain the principles of the embodiments, the practical applications, or technical improvements over technologies found in the marketplace, or to enable others of ordinary skill in the art to understand the disclosed technology.

What is claimed is:

1. A method for searching music, the method comprising:
    receiving a query comprising a pulse train representable by a plurality of query values defining a tempo of music to be searched;
    generating a tempo scale set based on the query, wherein the generating comprises:
        mapping each of the query values to a tempo scale representing a length of a musical note corresponding to the query value;
        wherein the tempo scale set is a set of tempo scales representing lengths of musical notes corresponding to the plurality of query values;
    constructing a tempo word set based on the generated tempo scale set, the tempo word set comprising one or more tempo words, wherein constructing each tempo word of the one or more tempo words comprises:
        collecting one or more tempo scales of the tempo scale set, wherein the two or more tempo scales are positioned in the tempo scale set at a predetermined interval from one another; and
    identifying the music based on the tempo word set.

2. The method according to claim 1, wherein mapping each of the query values to a tempo scale representing the length of the musical note corresponding to the query value comprises:
    calculating, for each query value in the received query, a ratio of the query value to a respective previous query value.

3. The method according to claim 1, wherein the constructing the tempo word set comprises:
    setting a set length of each tempo word of the tempo word set, the set length indicating the number of tempo scales contained in the tempo word;
    wherein each tempo word comprises a quantity of tempo scales equal to the set length.

4. The method according to claim 1, wherein said constructing the tempo word set comprises:
    generating a fault-tolerant tempo word corresponding to each of the tempo words.

5. The method according to claim 4, wherein said generating the fault-tolerant tempo word comprises:
    selecting one or more tempo scales contained in a corresponding tempo word; and
    replacing the selected tempo scales in said corresponding tempo word with corresponding fault-tolerant tempo scales to generate the fault-tolerant tempo word.

6. The method according to claim 5, wherein said generating a fault-tolerant tempo word further comprises:
    ranking the selected tempo scales; and
    selecting, for each tempo scale contained in said corresponding tempo word, a predetermined number of tempo scales that are anteriorly or posteriorly ranked, as fault-tolerant tempo scales for the tempo scale.

7. The method according to claim 1, wherein said query corresponds to a series of taps on an input device by a user.

8. An apparatus for searching music, the apparatus comprising:
    a tempo scale set generating unit, configured to:
        receive a query comprising a pulse train representable by a plurality of query values defining a tempo of music to be searched;
        generate a tempo scale set based on the query, wherein the generating comprises mapping each of the query values to a tempo scale representing a length of a note corresponding to the query value, wherein the tempo scale set is a set of tempo scales representing lengths of musical notes corresponding to the plurality of query values;
    a tempo word set constructing unit, configured to construct a tempo word set based on the tempo scale set generated by said tempo scale set generating unit, the tempo word set comprising a plurality of tempo words, wherein constructing each tempo word of the one or more tempo words comprises collecting one or more tempo scales of the tempo scale set, wherein the two or more tempo scales are positioned in the tempo scale set at a predetermined interval from one another; and
    a music identification unit, configured to identify the music based on the tempo word set constructed by said tempo word set constructing unit.

9. The apparatus according to claim 8, wherein mapping each of the query values to a tempo scale representing the length of the musical note corresponding to the query value, by the tempo scale set generating unit, comprises:
    a ratio tempo scale generating unit, configured to calculate, for each query value in the received query, a ratio of the query value to a previous query value.

10. The apparatus according to claim 8, wherein the tempo word set constructing unit comprises:
    a tempo word length setting unit, configured to set a set length of each tempo word of the tempo word set, the set length indicating the number of tempo scales contained in the tempo word;
    wherein each tempo word comprises a quantity of tempo scales equal to the set length.

11. The apparatus according to claim 8, wherein the tempo word set constructing unit comprises:
    a fault-tolerant tempo word generating unit, configured to generate a plurality of fault-tolerant tempo words, each fault-tolerant tempo word being generated for a corresponding one of the tempo words.

12. The apparatus according to claim 11, wherein the fault-tolerant tempo word generating unit comprises:
    a first fault-tolerant subunit, configured to select one or more tempo scales contained in a first tempo word; and
    a second fault-tolerant subunit, configured to replace the tempo scales in said first tempo word with corresponding fault-tolerant tempo scales to generate a first fault-tolerant tempo word corresponding to the first tempo word.

13. The apparatus according to claim 12, wherein the fault-tolerant tempo word generating unit further comprises:
    a tempo scale ranking unit, configured to rank the tempo scales in said tempo scale set; and
    a fault-tolerant tempo scale determining unit, configured to determine, for each tempo scale contained in said first tempo word, a predetermined number of tempo scales ranked before or after the tempo scale, and configured to set the predetermined number of tempo scales as fault-tolerant tempo scales to replace the tempo scale in the first tempo word when generating the first fault-tolerant tempo word.

14. The apparatus according to claim 8, further comprising an input device capable of receiving said query as a series of taps by a user on said input device.

15. A computer program product comprising a non-transitory computer readable storage medium having computer readable program code embodied thereon, the computer readable program code executable by a processor to perform a method comprising:

- receiving a query comprising a pulse train representable by a plurality of query values defining a tempo of music to be searched;
- generating a tempo scale set based on the query, wherein the generating comprises:
  - mapping each of the query values to a tempo scale representing a length of a musical note corresponding to the query value;
  - wherein the tempo scale set is a set of tempo scales representing lengths of musical notes corresponding to the plurality of query values;
- constructing a tempo word set based on the generated tempo scale set, the tempo word set comprising one or more tempo words, wherein constructing each tempo word of the one or more tempo words comprises:
  - collecting one or more tempo scales of the tempo scale set, wherein the two or more tempo scales are positioned in the tempo scale set at a predetermined interval from one another; and
- identifying the music based on the tempo word set.

16. The computer program product of claim 15, wherein said constructing the tempo word set comprises:

- setting a set length of each tempo word of the tempo word set, the set length indicating the number of tempo scales contained in the tempo word;
- wherein each tempo word comprises a quantity of tempo scales equal to the set length.

17. The computer program product of claim 15, wherein said constructing the tempo word set comprises generating a fault-tolerant tempo word corresponding to each of the tempo words, and wherein generating a fault-tolerant tempo word corresponding to each of the tempo words comprises:

- selecting one or more tempo scales contained in a corresponding tempo word;
- ranking the selected tempo scales;
- selecting, for each tempo scale contained in said corresponding tempo word, a predetermined number of tempo scales that are anteriorly or posteriorly ranked, as fault-tolerant tempo scales for the tempo scale; and
- replacing the selected tempo scales in said corresponding tempo word with the corresponding fault-tolerant tempo scales to generate the fault-tolerant tempo word.

\* \* \* \* \*